Jan. 4, 1966    C. I. WILLIAMS    3,227,031
ROCK BOLT ANCHOR ASSEMBLY

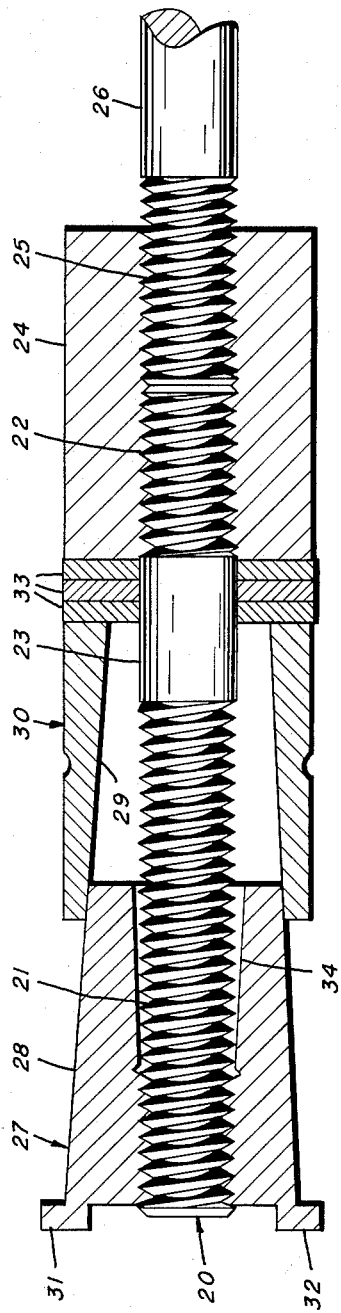
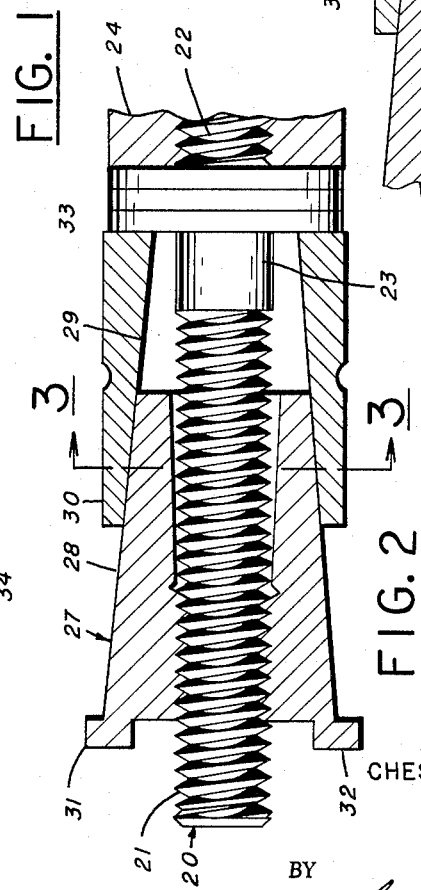
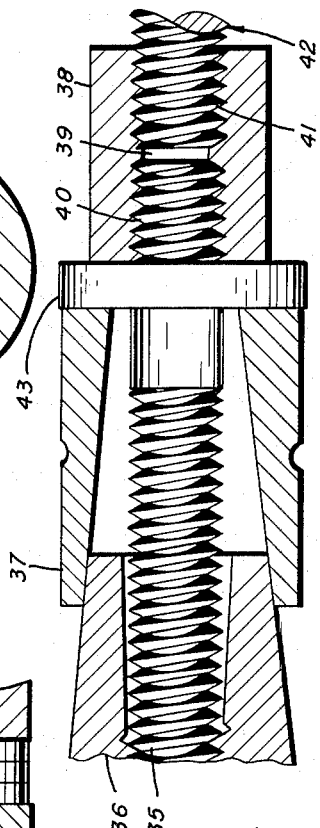

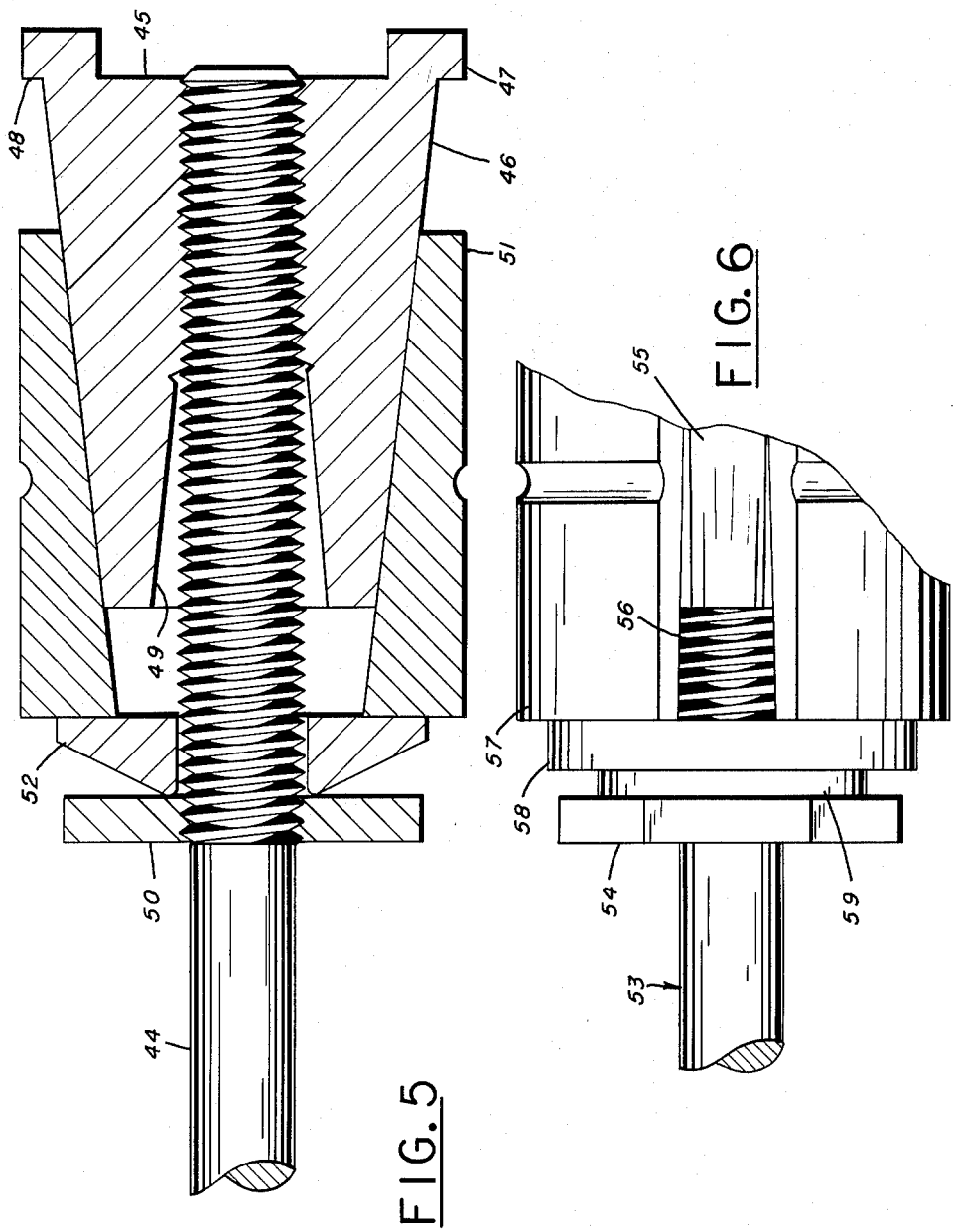

Filed July 5, 1962    5 Sheets-Sheet 3

CHESTER I. WILLIAMS
INVENTOR.

BY
Atty.

CHESTER I. WILLIAMS
INVENTOR.

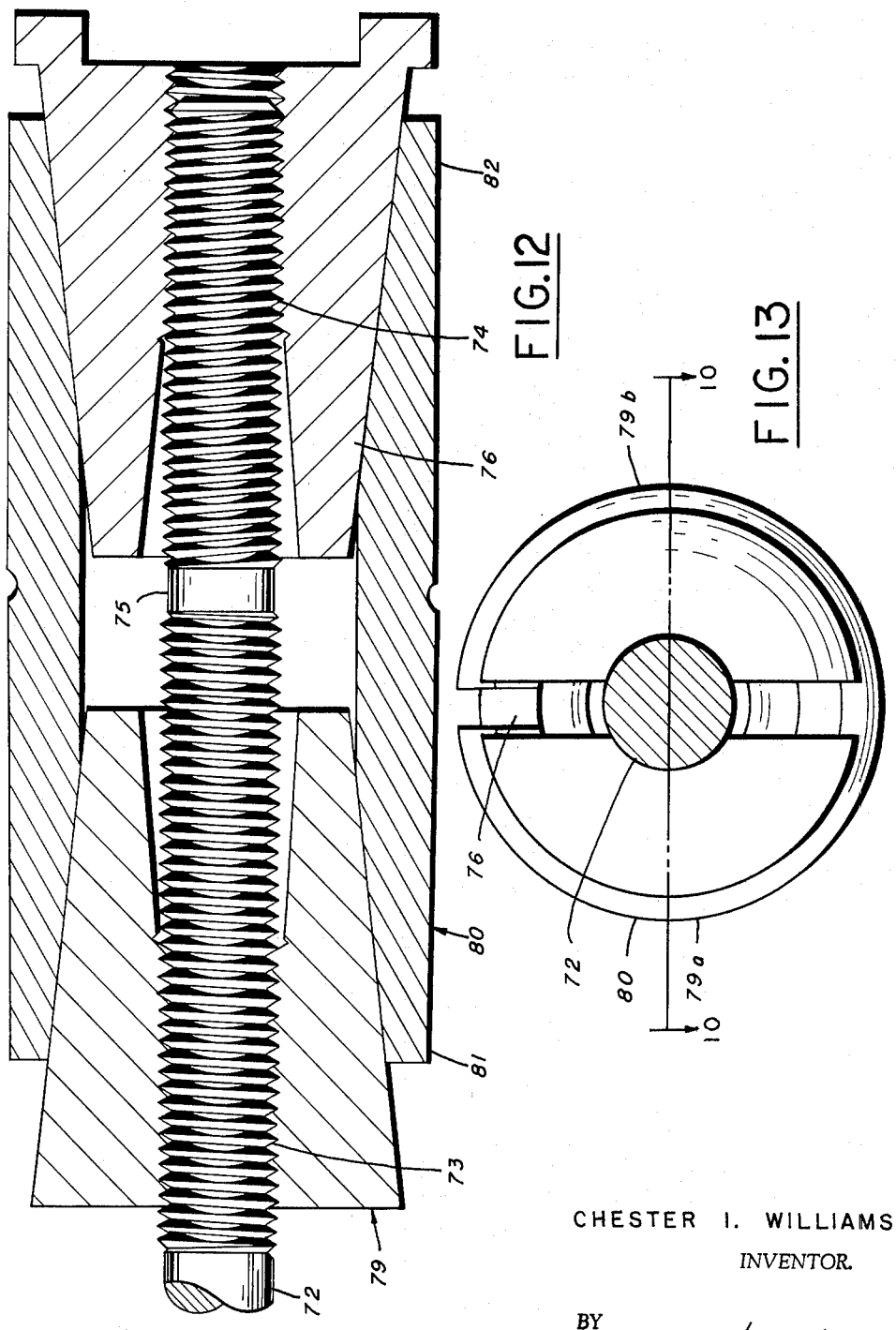

United States Patent Office 3,227,031
Patented Jan. 4, 1966

3,227,031
ROCK BOLT ANCHOR ASSEMBLY
Chester I. Williams, 347 Greenbriar SE.,
Grand Rapids, Mich.
Filed July 5, 1962, Ser. No. 207,530
3 Claims. (Cl. 85—67)

This invention relates to expansible anchoring devices used to secure a bolt to the walls of a bore in a rock formation. The holding ability of such a device is the principal limitation upon the effectiveness of the bolt, and the present invention provides for improved engagement of the anchor together with simplicity and reliability. The axial forces involved in "setting" the anchor are self-contained, and require no reaction bearing forces at the surface during this operation.

The anchor functions by the relative rotation of inter-engaged threaded members to produce movement along conical surfaces to generate the expansion into engagement with the walls of the rock bore. The invention provides for minimizing the tendency to strip out the thread systems, and assures actuation of the device on the beginning of rotation at the surface. The assembly provided by the preferred form of the invention is also readily attachable to random lengths of bolt rods so that the complete bolt assemblies need not be held in inventory for all lengths. The several features of the invention will be analyzed in further detail through a discussion of the particular embodiments illustrated in the accompanying drawings. In the drawings:

FIGURE 1 is an axial section of one modification of the invention, shown in the initial position prior to expansion.

FIGURE 2 is an axial section illustrating the same device shown in FIGURE 1, in a partially expanded condition.

FIGURE 3 is a section on the plane 3—3 of FIGURE 2.

FIGURE 4 is an axial section illustrating a modified form of the invention, in the initial position.

FIGURE 5 is an axial section illustrating a modified form of the invention, in the partially expanded condition.

FIGURE 6 illustrates a further modification of the invention, shown in side elevation.

Figure 7:
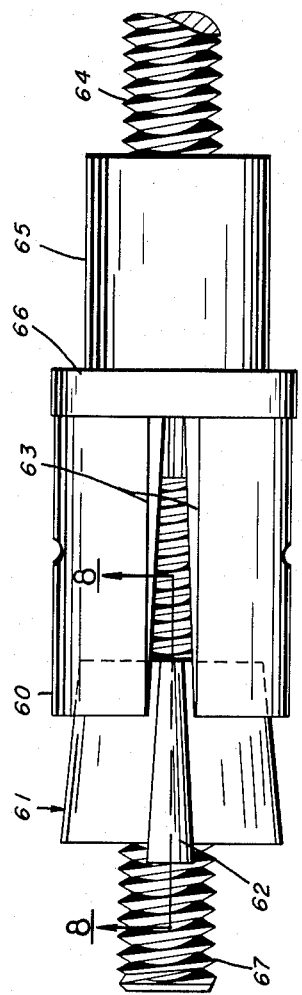
FIGURE 7 illustrates a side elevation of a modified form of the invention, in the initial position.
Figure 8:
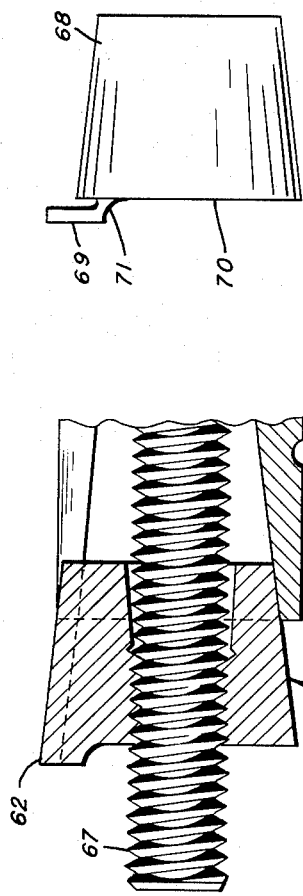

FIGURE 8 presents an axial section of a portion of the device shown in FIGURE 7.

Figure 9:
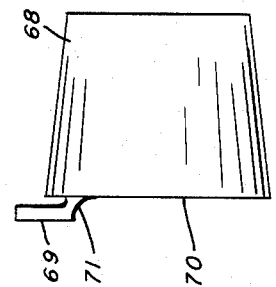

FIGURE 9 presents a side elevation of a further modification of the invention.

Figure 10:
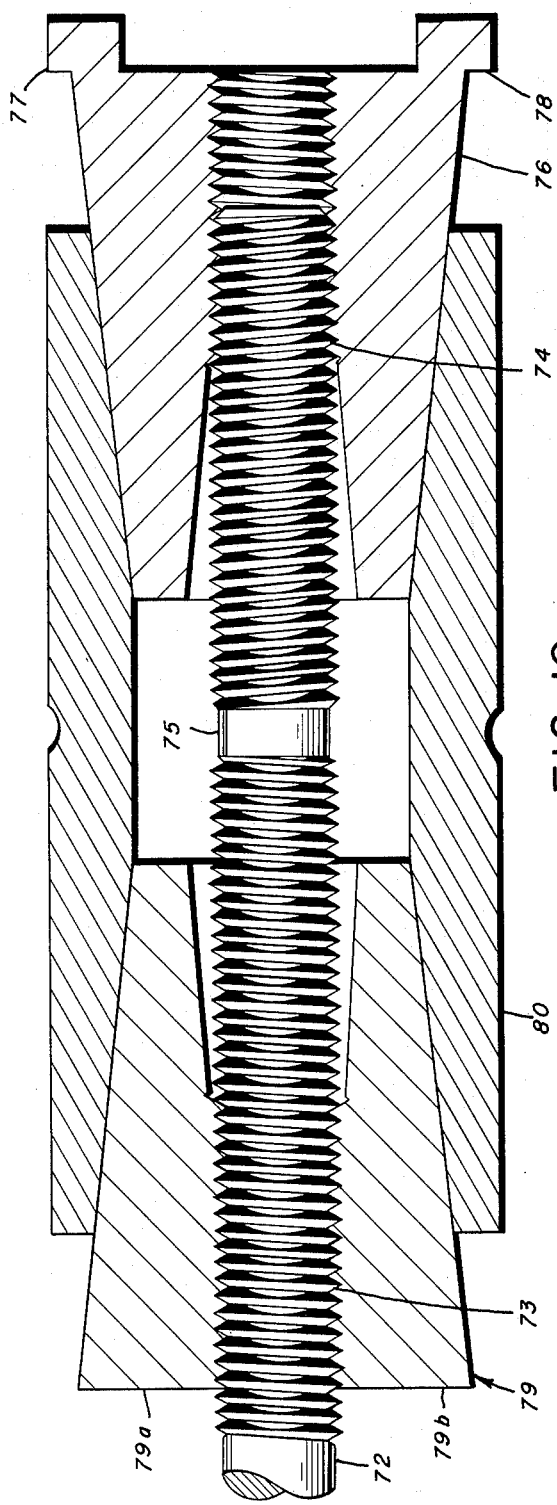

FIGURE 10 illustrates a further modification of the invention, in sectional elevation showing the initial position.

Figure 11:
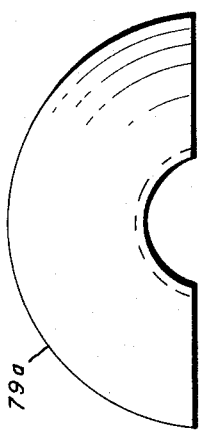

FIGURE 11 illustrates an end view of one of the ring segments shown in the FIGURE 10 assembly.

FIGURE 12 illustrates the device shown in FIGURE 10, in an eccentric partially expanded condition.

FIGURE 13 is an end view of the device shown in FIGURE 12.

The anchor assembly illustrated in FIGURES 1 and 2 includes the extension rod 20 having the threaded ends 21 and 22 of similar "hand," and the central un-threaded portion 23. A coupling 24 has a central bore provided with a thread system throughout which engages the threaded end 22, and also the threaded end 25 of the rock bolt 26. The coupling 24 is preferably threaded onto the end 22 of the extension rod 20 to the full depth of the threaded end 22, so that the end of the rod 20 presents an abutment limiting the depth of engagement of the threaded end 25 of the rock bolt 26. With this arrangement, the torque applied to the rock bolt 26 to expand the anchor assembly will have a minimum tendency to strip out the thread system, as the torque is distributed over a very substantial length of the threaded engagement, rather than being centered in a relatively few turns. The arrangement also automatically provides for properly positioning the coupling 24 with respect to the threaded ends 22 and 25 so that the coupling properly engages both rods.

The opposite threaded end 21 engages an expander cone 27 having a peripheral surface 28 in the form of a conical surface engaging the interior conical surface 29 of the C-shaped expansion shell 30. In this modification of the device, a pair of lugs 31 and 32 project radially beyond the conical surface 28 for engagement with the wall of the rock bore (in which the assembly would be inserted) to generate a resistance to rotation of the expander 27. This resistance will induce a relative rotation between the expander 27 and the rod 20, producing an axial movement of the expander to the right as shown in FIGURES 1 and 2. This movement will increase the circumscribed diameter around the expansion shell 30, and ultimately drive the shell into solid engagement with the wall of the rock bore.

There will obviously be relative rotation between the coupling 24 and the expansion shell 30, and there will also be a tremendous amount of axial thrust during the latter stages of the engagement of the device. To minimize the torque transfer which will otherwise absorb too much of the driving power, a group of lubricated thrust rings 33 are installed on the central portion 23 of the rod 20. It should be noted that the expansion of the shell 30 will progressively increase the diameter of the annular surface of thrust transfer to the shell, and the function of the bearing rings 33 to distribute the thrust forces over a large area to avoid complete squeeze-out of lubricant. These rings may be hardened, if desired. The rotation of the rock bolt 26 (normally by a power-operated wrench) will move the assembly from the FIGURE 1 position to that of FIGURE 2, and normally will proceed further so that the clearance bore 34 will overlap the unthreaded central portion 23 in telescoping relationship to accommodate the maximum axial movement of the expander 27 with respect to the rod 20.

The device shown in FIGURE 4 is similar in the general principles of operation. The extension rod 35, the cone expander 36, and the C-shaped expansion shell 37 may be identical to the corresponding members shown in FIGURES 1 and 2. The coupling 38 has an interruption in the threaded bore in the central portion at the point indicated at 39 for limiting the depth of penetration of either the threaded end 40 of the rod 35 or the threaded end 41 of the rock bolt 42. The smaller outside diameter of the coupling 38 reqiures a somewhat heavier thrust ring 43, as the expansion of the shell 37 will generate an annular thrust-transfer area of greater diameter than that of the coupling 38. This will tend to produce a diaphragm-type deflection of the thrust ring 43 unless it is of substantial rigidity. One advantage of the reduced diameter of the coupling 38 is a reduction in the frictional torque transfer, on the assumption that the resulting pressure does not produce a seizure of the interengaging surfaces of the ring 43 and the coupling 38. The net axial thrust force between the shell 37 and the ring 43 is the same as that between the ring 43 and the coupling 38. The effective diameter at which these thrust forces are transferred is much smaller between the ring 43 and the coupling 38, resulting in there being less capability of frictional torque transfer between the ring and the coupling than between the ring and the sleeve 37.

The modifications shown in FIGURES 5 and 6 present other arrangements for minimizing the frictional torque transfer. The modifications shown in FIGURES 5 and 6 are particularly useful when extension rods and couplings are not used. The rock bolt 44 has a long threaded end which engages the cone-shaped expander 45 having the conical peripheral surface 46 and the torque lugs 47 and 48. The clearance bore 49 may also be used in this modification, since it facilitates the assembly of the expander to the end of the bolt 44. It is usually unnecessary to provide a threaded bore extending over the full length of the expander. The clearance bore 49 is preferably conical in shape to provide some degree of "lead-in" to make the initial engagement of the threads as simple as possible.

The thrust necessary to induce the relative movement between the expansion sleeve 50 and the expander 45 is opposed by the thrust ring 50. This ring is in threaded engagement with the end of the rock bolt 44, and its further movement along the thread system is limited by the engagement of the ring with the end of the threaded length of the bolt. With this arrangement, it is vital that the torque transfer between the thrust ring 50 and the remainder of the assembly be reduced to a minimum to avoid a tendency for continued relative rotation of the ring 50 with respect to the rock bolt 44 which would twist the ring right off the end of the threaded length. The resistance to rotation is centered in the last one or two turns of the threading, which limits the ability of the ring 50 to resist excessive torque. The progressive expansion of the shell 51 will produce a correspondingly increased diameter of the area over which the axial forces are transferred, and this action will correspondingly increase the torque effect of these forces (before slippage takes place) against whatever member is in bearing engagement with the expansion shell 51. The heavy beveled transfer ring 52 serves the function of a rigid transverse bearing surface over which the thrust forces may be applied to the expansion shell 51, and yet provides a constant minimum diameter at the point of engagement with the thrust ring 50. This arrangement will normally necessitate forming the ring 50 out of hardenable material, or with a locally hardened surface at the point of engagement with the transfer ring 52. The transfer ring may be similarly formed, and lubrication should be present on both faces of the transfer ring for best operation.

The arrangement shown in FIGURE 6 is similar in principle to that of FIGURE 5, differing primarily in the substitution of two transfer rings of different diameter for the beveled transfer ring 52. The rock bolt 53 receives the thrust ring 54 at the end of its threaded length, in the manner shown in FIGURE 5. The cone 55 is moved axially by the thread system 56 on the rod 53, producing expansion of the circumscribed diameter around the shell 57. The larger ring 58 provides the transverse surface of sufficient diameter to accommodate the full expansion movement of the shell 57, and the smaller ring 59 reduces the effective diameter of thrust transfer against the thrust ring 54.

The modification shown in FIGURES 7 and 8 includes an arrangement for accommodating the maximum relative axial movement between the expansion shell 60 and the conical expander 61 without interference from a torque lug such as the lugs 47 and 48 of FIGURE 5. A fixed lug would ultimately come into axial engagement with the end of the shell, and thereby prevent further relative axial movement. FIGURE 7 illustrates a single continuous torque lug projection 62 which is disposed within the discontinuity of the C-shaped expansion shell 60. This opening is indicated at 63, and the continuous lug 62 interengages with it in the manner of a key and a keyway. The lug will therefore at all times be in a position where it cannot axially abut the end of the expansion shell 60. The material forming the single lug 62 will amount to a displacement of the center of gravity of the assembly into an eccentric position, which will facilitate the engagement of the lug 62 with the surrounding wall of the rock bore engaged by the rock bolt 64. Rotation of the rock bolt will transfer torque through the coupling 65 and the thrust ring 66 to the extension rod 67, and this rotation will tend to produce an orbital movement of the entire assembly within the confines of the rock bore, with the heavy side of the assembly outermost. While the material removed from the shell 60 to produce the gap at 63 will lighten that side of the assembly, it is possible to proportion the length of the cone expander 61 and the lug 62 to more than compensate for this removal of material, and bring the center of gravity of the entire assembly on the side of the lug 62.

FIGURE 9 illustrates a modified cone expander embodying a different arrangement for preventing a torque lug from interfering with full axial movement of a cone with respect to the surrounding sleeve. The cone expander 68 has the lug 69 secured at a point somewhat radially inside the major diameter of the end 70, with the point of connection being deliberately formed to provide a point of weakness at the attaching portion 71 for permitting fracture at that area. The dimensions of this point of connection of the lug 69 to the expander 68 should be sufficient in a peripheral direction to generate the necessary torque, but the resistance to bending in a counterclockwise direction, as shown in FIGURE 9, can be relatively small. The collision of the end of an expansion shell with the lug 69 as the anchor device is actuated will immediately induce fracture at the attaching portion 71, which is so disposed that the remaining material will provide no interference with the further axial movement of the expander with respect to the expansion sleeve.

The device shown in FIGURES 10, 11, 12, and 13 utilizes a double expansion principle that eliminates the need of a thrust ring, and applies expansion pressure over a greater axial length of the expansion shell. The rock bolt 72 (or an extension rod) is formed with the thread systems 73 and 74 of opposite hand, preferably with a short un-threaded central portion 75 between these systems for simplicity of manufacture. The thread system 74 is of the conventional right-hand variety, and cooperates with a cone expander 76 similar to the expander 45 in FIGURE 5. The lugs 77 and 78 may be included, if desired. The cone expander 79 is in two segments, 79a and 79b. These are laterally separable, and are placed in engagement with the threaded portion 73 from the side. The expanders 76 and 79 both engage correspondingly conical surfaces on the long expansion shell 80. In assembling the device, the segments 79a and 79b may first be placed in engagement with the thread system 73, followed by the axial placement of the sleeve 80 over the expander 79. The expander 76 may then be threaded into position. Rotation of the rod 72 by a power wrench will first generate a rotation of the entire assembly until the lugs 77 and 78 dig into the rock formation in the wall of the bore to generate a rotation of the cone member 76 with respect to the rod 72. This will produce a relative axial movement of the expander 76 to the left, and immediately generate a clamping action which will rotatively seize the shell 80 and the expander 79 so that all of these will move together and rotate with respect to the rod 72. The rotation of the expander 79, since it engages the rod 72 with a thread system of opposite hand to that of the threads 74, will produce an axial movement to the right in opposition to the movement of the cone member 76 to the left, as shown in FIGURE 10. The shell 80 is therefore expanded at both ends. It is easily conceivable that either one end or the other might run into obstruction from the bore in the rock formation at an earlier moment than the opposite end. The assembly easily accommodates this condition by centering the relative axial movement of the device in the expander at the unobstructed end of the shell 80. The rate of movement would be doubled, and the device would instantly accommodate itself to the irregularity of contour in the bore in the rock. This condition is illustrated in FIGURE 12, where it is assumed that the end 81 of the shell 80 has run into a limit against further peripheral expansion, with the opposite end 82 still unobstructed. All of the axial movement of the device would then be centered in the expander 76, with the expander 79 remaining momentarily in fixed axial position with respect to the sleeve 80. It should be noted that all of these arrangements will confine the opposing axial forces involved in the expansion within the assembly. This not only reduces the friction loss required at the surface to actuate the anchor, but makes the assembly of the device much simpler. Much less care is required in the actual setting of the anchor than would be the case where a bearing plate and thrust-transfer devices must be properly positioned before application of the torque.

The particular embodiments of the present invention which have been illustrated and discussed herein are for illustrative purposes only and are not to be considered as a limitation upon the scope of the appended claims. In these claims, it is my intent to claim the entire invention disclosed herein, except as I am limited by the prior art.

I claim:
1. An anchoring device for a rock bolt having a threaded end-portion, said device comprising:
 a cone member having a threaded bore normally engaging said threaded end-portion, and a conical peripheral surface coaxial with said bore,
  said cone member having a projection extending radially beyond the larger end thereof, and attached to said cone member radially inward of the larger end thereof,
  said projection having relatively secure attachment to said cone with respect to tangential forces, and relatively weak attachment to said cone with respect to axial forces, and including an attaching portion having the smallest cross-sectional area of said projection to establish a point of stress concentration with respect to said axial forces to induce break-off at a location radially inward from the plane of said conical surface;
 an expansible shell member surrounding said cone member; and
 a thrust member axially fixed with respect to said end-portion, said shell member being axially interposed between said thrust member and cone member.

2. An anchoring device for a rock bolt assembly having a threaded end-portion, said device comprising:
 a cone member having a threaded bore normally engaging said threaded end-portion, and a conical peripheral surface coaxial with said bore;
 an expansible shell member surrounding said cone member; and
 at least one thrust member axially fixed with respect to said end-portion, said shell member being axially interposed between said thrust member and cone member,
  said thrust member including a ring having threaded engagement with said threaded end portion at the limit of the threading thereof; and
 thrust transfer means interposed between said thrust member and said shell member, said thrust transfer means being relatively axially rigid under forces resulting from movement of said cone member with respect to said threaded end-portion, and
 engaging said thrust member exclusively at a constant radial distance substantially less than the radial distance of the point of engagement with said shell member.

3. An anchoring device for a rock bolt assembly having a threaded end-portion, said device comprising:
 a cone member having a threaded bore normally engaging said threaded end-portion, and a conical peripheral surface coaxial with said bore;
 an expansible shell member surrounding said cone member; and
 a thrust member axially fixed with respect to said end-portion, said shell member being axially interposed between said thrust member and cone member,
  said thrust member including a ring having threaded engagement with said threaded end portion at the limit of the threading thereof; and
 thrust transfer means including a solid conical washer interposed between said thrust member and said shell member, with the smaller end of said washer engaging said thrust member.

References Cited by the Examiner
UNITED STATES PATENTS

| | | | |
|---|---|---|---|
| 570,786 | 11/1896 | Church. | |
| 681,817 | 9/1901 | Smith | 85—75 |
| 691,921 | 1/1902 | Wheeler | 85—67 |
| 841,338 | 1/1907 | Palmer | 85—76 |
| 1,053,622 | 2/1913 | McAllister | 287—117 |
| 1,120,408 | 12/1914 | Rohmer et al. | |
| 1,120,657 | 12/1914 | Rohmer | 85—69 |
| 1,302,324 | 4/1919 | Devlin | 85—75 |
| 1,628,253 | 5/1927 | Lyddane. | |
| 2,075,714 | 3/1937 | Hamill | 85—67 |
| 2,442,113 | 5/1948 | Beijl. | |
| 2,625,071 | 1/1953 | Lewis. | |
| 3,058,386 | 10/1962 | Morrow | 151—19 |
| 3,144,803 | 8/1964 | Briles | 151—38 |

FOREIGN PATENTS 444,623    3/1936    Great Britain.

CARL W. TOMLIN, *Primary Examiner.*
EDWARD C. ALLEN, *Examiner.*
R. S. BRITTS, *Assistant Examiner.*